United States Patent [19]

Arora

[11] Patent Number: 5,241,688

[45] Date of Patent: Aug. 31, 1993

[54] FREQUENCY AND TIME SLOT SYNCHRONIZATON USING ADAPTIVE FILTERING

[75] Inventor: Arvind S. Arora, Arlington Heights, Ill.

[73] Assignee: Motorola, Inc., Schaumburg, Ill.

[21] Appl. No.: 970,430

[22] Filed: Nov. 2, 1992

Related U.S. Application Data

[63] Continuation-in-part of Ser. No. 628,535, Dec. 17, 1990, abandoned.

[51] Int. Cl.[5] .......................... H04B 7/01; H04B 1/40; H04L 27/06; H04J 3/16
[52] U.S. Cl. ..................................... 455/51.1; 455/71; 455/75; 455/265; 375/97; 370/95.3
[58] Field of Search ................. 455/51.1, 33.1, 71, 455/70, 164.1, 56.1, 182, 265, 264, 267, 316, 89, 266, 38.5, 54.1, 63, 75; 375/97; 379/58, 59, 61, 63; 370/95.1, 95.3, 50, 58.1, 57

[56] References Cited

U.S. PATENT DOCUMENTS

| | | | |
|---|---|---|---|
| 4,371,220 | 2/1982 | Martin | 455/71 |
| 4,466,130 | 8/1984 | Severinson | 455/71 |
| 4,977,580 | 12/1990 | McWicol | 375/97 |
| 5,081,652 | 1/1992 | Farahati et al. | 375/97 |

FOREIGN PATENT DOCUMENTS

| | | | |
|---|---|---|---|
| 2171064(A) | 7/1990 | Japan | 375/97 |
| WO90/09069 | 8/1990 | PCT Int'l Appl. | 375/97 |

Primary Examiner—Reinhard J. Eisenzopf
Assistant Examiner—Lisa Charouel
Attorney, Agent, or Firm—Kenneth W. Bolvin

[57] ABSTRACT

The synchronization process of the present invention filters the received signal with an adaptive band-pass filter (101) while buffering the received signal in memory (108). The energies of the input signal and the filtered signal are estimated (103 and 104) and the gain of the filter is adapted (105) based on the difference between the energies. The pole of the filter is adapted (102) to center the frequency of the input signal in the filter's pass-band. If a tone is detected (106), the length of the tone is determined (107) to ascertain if it is a frequency correction burst (FCB). If the tone detected is an FCB, the signal in the memory is also the FCB that is then filtered in the band-pass filter (101) and the difference between the frequency of this signal and 67.5 kHz is determined (109). This difference represents the frequency offset between the base station carrier frequency and that of the mobile radiotelephone, and can be fed into the local oscillating means to compensate for the frequency offset. The boundaries of the FCB establish the time slot alignment of the TDMA structure being received from the base station.

7 Claims, 2 Drawing Sheets

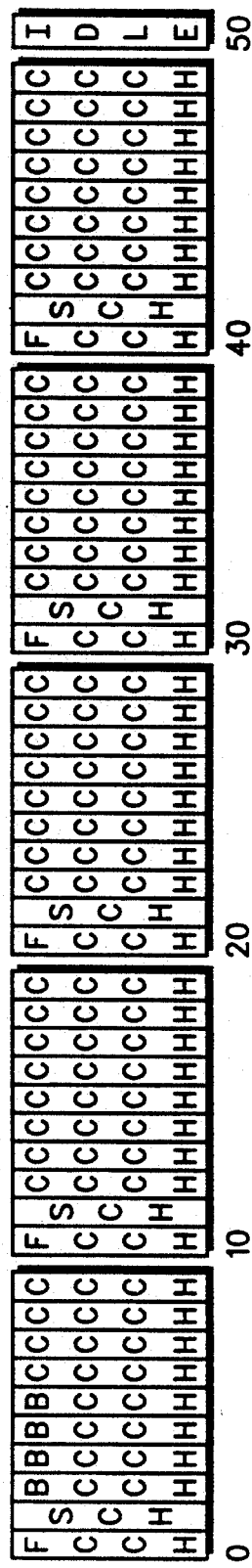
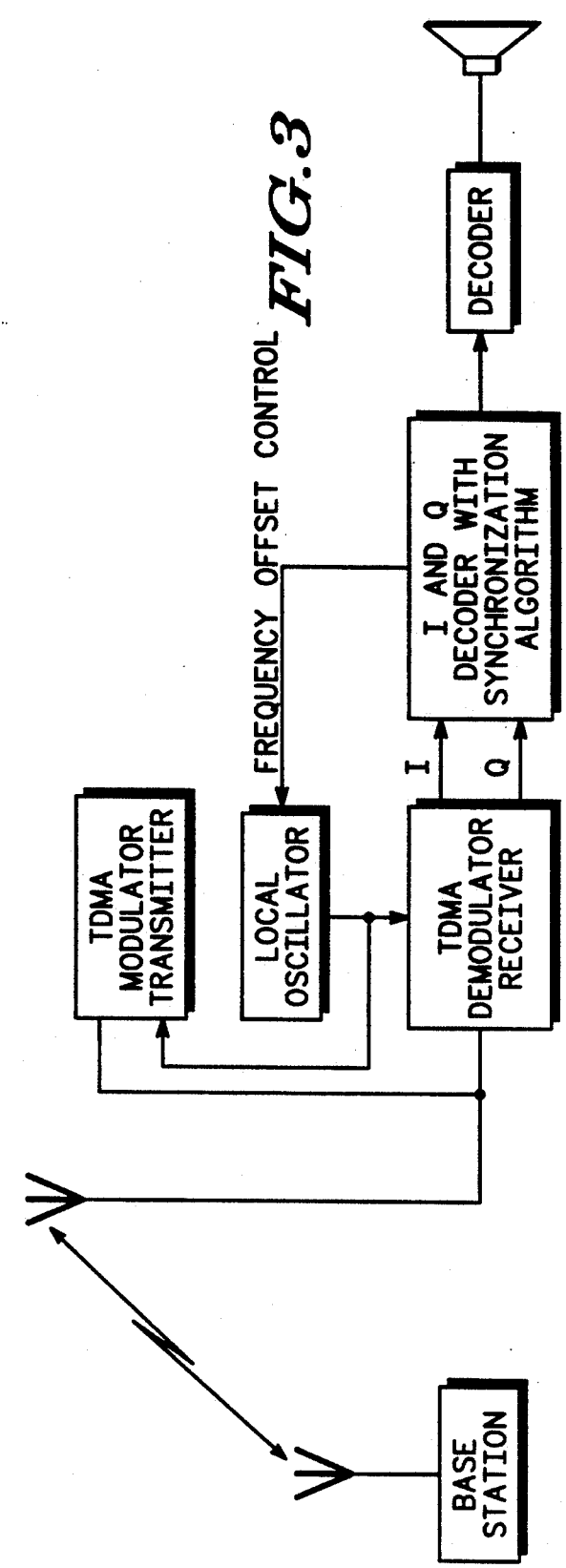
*TDMA Multi Frame, Broadcast Channel*
FIG. 2
FIG. 3

FREQUENCY AND TIME SLOT SYNCHRONIZATON USING ADAPTIVE FILTERING

FIELD OF THE INVENTION

This is a continuation-in-part of application Ser. No. 07/628,535, filed Dec. 17, 1990, now abandoned.

The present invention relates generally to the field of communications and particularly to frequency and time slot synchronization in a mobile communication environment.

BACKGROUND OF THE INVENTION

Since a mobile radiotelephone does not have an accurate enough frequency reference internally, it must make fine frequency adjustments to achieve the required frequency synchronization to a base station frequency. In a time domain multiple access (TDMA) system, multiple logical channels are transmitted on the same frequency, but separated in time, FIG. 2. To communicate with a base station, the mobile radiotelephone must also find the boundaries of these time slots, called time slot synchronization.

The different base stations in a cellular radiotelephone system maintain very accurate frequency references, but utilize different transmission frequencies, and possibly different time slot alignments. When a mobile radiotelephone is handed off from one cell to another in a cellular radiotelephone system, the mobile may need some minor frequency adjustment, as well as complete time slot synchronization to communicate with the new base station.

To accomplish this in a digital cellular radiotelephone system, the radiotelephone first finds a frequency correction channel (FCCH), which is part of the broadcast control channel (BCCH). FIG. 2 illustrates the FCCH slots (201) and other data control channels that make up the multiframe TDMA structure of the BCCH. This format is described in greater detail in the digital cellular standard specification GSM Recommendation 5.02, Version 3.3.1, Oct. 13, 1989.

The base band signal of the FCCH is a frequency correction burst (FCB), a pure tone (sine wave) at 67.5 kHz, consisting of 148 samples, sent periodically and it always occurs in time slot zero of the data stream. The offset between the carrier frequencies of the base station and the mobile radiotelephone is translated to the base band as a deviation from 67.5 kHz. The boundaries of the FCB delineate the time slots of the TDMA structure. From the FCCH detected, the mobile radiotelephone synchronizes its local oscillator frequency and time slot boundaries with those of the base station using the frequency correction burst in the FCCH time slot.

Since the burst is relatively short, the mobile must find it in the data stream and synchronize with it in this short period. There is a resulting need for a process that can detect the presence and boundaries of the FCB very rapidly, and estimate the frequency offset very accurately, even when signals are received in the presence of noise.

SUMMARY OF THE INVENTION

The synchronizing process of the present invention is comprised of the steps of filtering a received signal with adaptive filtering means, buffering this signal in storage means, and determining if the frequency correction tone is present, (the detection process). This also establishes the boundaries of the TDMA time slots. When this frequency correction tone is present, filtering the buffered signal and determining the difference between the frequency of this filtered signal and 67.5 kHz, (the carrier frequency offset estimation process).

BRIEF DESCRIPTION OF THE DRAWINGS

FIG. 2 shows the TDMA, multiframe, broadcast control channel format.

FIG. 3 shows a typical radiotelephone, using the process of the present invention, for use in a TDMA type system.

DETAILED DESCRIPTION OF THE PREFERRED EMBODIMENT

Figure 1:
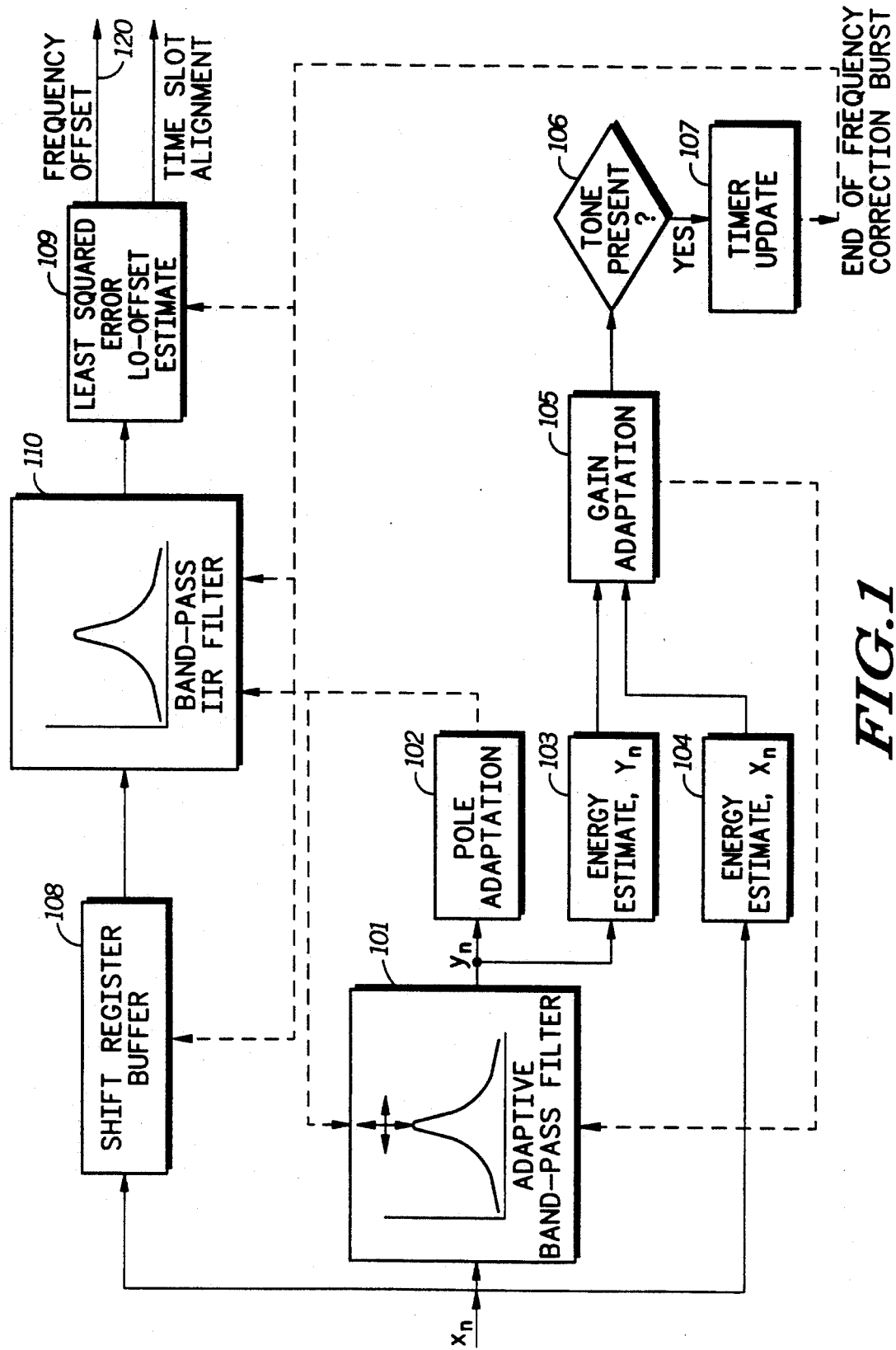
FIG. 1 shows a block diagram of the process of the present invention.

The process of the present invention provides rapid frequency and time slot synchronization between a mobile radiotelephone and the base station with which it is communicating. This is accomplished by detecting the presence and boundaries of the frequency correction burst and determining the frequency of this base band tone.

The preferred embodiment of the process of the present invention is illustrated in FIG. 1. The input to this process is one of the two base band quadrature signals, the I or Q data stream, sampled at one sample per bit-time, from the receiver of the radiotelephone. This signal, labeled $x_n$ in FIG. 1, is initially filtered by a second order, infinite impulse response (IIR) bandpass filter (101). Both the gain and the pole of this filter are adaptive. The gain is adjusted in order to maintain substantially unity gain through the filter. In other words, the energy at the output is equal to the energy at the input. The pole of the filter is moved so that the passband of the filter encompasses the received signal. The signal output from the filter is labeled $y_n$. The filtering is performed as follows:

$$y_{n+1} = b_n x_{n+1} + a_n y_n + (-r_0^2) y_{n-1}$$

The energy of the input signal and the energy of the filtered signal are then estimated in the energy estimation blocks (103 and 104). The estimation for the input energy is accomplished as follows:

$$E(x)_{n+1} = (1 - a_e) E(x)_n + a_e x_{n+1}^2$$

The estimate for the filtered signal energy is as follows:

$$E(y)_{n+1} = (1 - a_e) E y_n + a_e y^2_{n+1}$$

where $a_e$ is the energy adapation coefficient and is set equal to 0.091 for the estimation operations.

The input and the output energies, $E(x)_{n+1}$ and $E(y)_{n+1}$, are compared in the gain adaptation block (105) and the gain /f the filter is adapted to match the input and filtered signal energies. This adapted gain is then fed back to the filter. This comparison and adaptation is performed as follows:

$$g_{n+1} = \sqrt{E(x)_{n+1}/E(y)_{n+1}},$$

$$b_{n+1} = b_n(1 + a_b(g_{n+1} - 1))$$

where $b_{n+1}$ is the gain in the adaptive filter and $\alpha_b$ is the gain adaptation coefficient and is set to 0.077 for the gain adaptation operation.

The pole adapatation block (102) estimates the instantaneous frequency of the filtered signal. The pole of the adaptive filter is adapted toward this frequency and the new pole location is fed back to the filter (101). This operation is as follows:

If $(y_n^2 > 0.15\ E(y)_{n+1})$ then

If $(|2y_n| > |y_{n-1} + y_{n+1}|)$ then $\theta_{n+1} = (y_{n-1} + y_{n+1}/(y_n)$ $a_{n+1} = \alpha_p a_n + (1 - \alpha_p) r\ \theta_{n+1}$ End If End If where $\theta_n$ is an instantaneous pole estimate and $\alpha_p$ is the pole adaptation coefficient and is set to 0.083 for the pole adaptation operation. When the adaptive filter tracks a pure tone, such as in the frequency correction burst, all the energy in the input signal is in the band of the bandpass filter. Unit gain can thus be achieved through the filter (101) with the lowest value of the filter gain. This condition is checked to determine the instantaneous presence of a tone in the tone detection block (106). If $g_{n+1}$ is less than a threshold of 1.2 and $b_{n+1}$ is less than a threshold of $f(a_n)$, then the tone is present.

The timer block (107) measures the length of time for which the tone present condition persists. If this tone is present for at least 100 samples in the preferred embodiment, the presence of the frequency correction burst has been verified. This integration prevents the algorithm from falsely detecting a signal that, for short periods, may appear like a narrowband signal.

The signal $x_n$, that was input to the filter (101), is also stored in a signal buffer (108). Once it has been determined that this stored signal is the frequency correction burst, the input signal sampling is stopped so that the frequency correction burst is retained in the buffer. The signal from the buffer (108) is input to the band-pass filter (110) again using optimum coefficients, a* and b*, determined during the detection process. Since the passband of the filter (110) is now tuned to the frequency of the frequency correction burst, after the above adaptation process, it passes this signal without attenuation, and filters out the background noise, thus improving the effective signal-to-noise ratio.

$$w_{n+1} = b^* x_{n+1} + a^* w_n + (-r_0^2) w_{n-1}$$

The output of the band pass filter (110), $w_n$, is next processed using a Least Squared Error estimation process (109) on $\theta_n$ to generate an optimum estimate, $\theta^*$. The radian frequency of the received frequency correction burst is given as:

$$q^* = \cos^{-1}(q^*)/(2r_0).$$

The difference between $q^*$ and $\pi/2$ (67.5 kHz) is the frequency offset (120), measured in radian frequency, between the carrier frequencies of the base station and the mobile radiotelephone. This difference is used as the control to the local oscillator (301) to correct the frequency offset in the carrier frequency of the mobile radiotelephone as illustrated in FIG. 3. The above described process is performed periodically to keep the mobile radiotelephone locked to the base station carrier frequency.

An example of the receive portion of a typical mobile radiotelephone for use in a TDMA system is illustrated in FIG. 3. The I and Q decoder block contains the synchronization process of the present invention disclosed herein. This type of radiotelephone is discussed in greater detail in copending U.S. patent application Ser. No. 590,415 *Interference Reduction Using an Adaptive Receiver Filter, Signal Strength, and BER Sensing* filed Sep. 28, 1990 on behalf of Cahill and assigned to Motorola.

In summary, a novel process has been shown that will synchronize a mobile radiotelephone's local oscillator frequency and time slot positioning with those of the received signal from a base station. This synchronization occurs in real time and with significantly enhanced accuracy.

I claim:

1. A method for frequency synchronization between a cellular communication base station that transmits a plurality of signals, at least one of the plurality of signals having a frequency correction tone, and a mobile communication device that receives the plurality of signals, each of the plurality of signals having a carrier frequency, the mobile communication device having local oscillating means with a variable frequency, the method comprising the steps of:

filtering an input signal of the plurality of signals to produce a first filtered signal;

buffering the input signal to produce a buffered signal;

determining if the frequency correction tone is present in the input signal by determining an energy of the input signal and an energy of the first filtered signal and a duration for which a relationship between these energies exists;

when the frequency correction tone is present, filtering the buffered signal to produce a second filtered signal; and when the frequency correction tone is present, determining from the second filtered signal a frequency difference between the carrier frequency of the input signal and a frequency of the local oscillating means.

2. The method of claim 1 and further including the step of adjusting the local oscillating means of the mobile communication device in response to the frequency difference.

3. The method of claim 1 wherein the relationship between the energy of the input signal and the energy of the first filtered signal is equality.

4. A method for frequency synchronization in a time division multiple access (TDMA) cellular communication system between a communication base station that transmits a plurality of TDMA signals at a plurality of frequencies, and a mobile communication device that receives the plurality of signals, each signal having a carrier frequency and is comprised of a plurality of samples and at least one of the signals having a frequency correction tone, the mobile communication device having local oscillating means with a variable frequency that varies in response to the frequency correction tone, the method comprising the steps of:

filtering a first signal of the plurality of signals with an adaptive filter to produce a filtered signal, the adaptive filter having a variable gain and a variable pole;

buffering the first signal to produce a buffered signal;

determining a first energy level of the first signal;

determining a second energy level of the filtered signal;

varying the gain of the adaptive filter in response to a difference between the first and second energy levels;

varying the pole of the adaptive filter in response to a frequency of a second signal;

when the first energy level is equal to the second energy level, determining a quantity of samples of the first signal for 7hich a relationship between the first and the second energies exists;

when the quantity of samples is substantially a predetermined number, filtering the buffered signal to produce a second filtered signal; and if the quantity of samples is substantially the predetermined number, determining from the second filtered signal a frequency difference between the carrier frequency of the first signal and a frequency of the local oscillating means.

5. The method of claim 4 and further including the step of adjusting the local oscillating means of the mobile communication device in response to the frequency difference.

6. A radiotelephone for use in a TDMA type cellular communication system, the radiotelephone having demodulation means for generating I and Q signals, the radiotelephone comprising:

a) means for transmitting a signal;

b) means for receiving a plurality of signals, coupled to the demodulation means, the demodulation means processing the plurality of signals to generate the I and Q signals; and c) processing means for processing the I or Q signals, the processing means performing the steps of:

filtering a first signal of the plurality of signals with an adaptive filter to produce a first filtered signal;

buffering the first signal to produce a buffered signal;

determining if the frequency correction tone is present in the first signal by determining an energy of the first signal and an energy of the first filtered signal and a duration for which a relationship between these energies exists;

when the frequency correction tone is present, filtering the buffered signal to produce a second filtered signal containing carrier frequency offset information; and when the frequency correction tone is present, determining from the second filtered signal a frequency difference between a carrier frequency of the first signal from a base station and a frequency of a local oscillating means of the radiotelephone.

7. A radiotelephone for use in a TDMA type communication system, the radiotelephone having demodulation means for generating I and Q signals from received signals, the radiotelephone comprising:

means for transmitting signals;

means for receiving signals, each signal having a carrier frequency, the means for receiving signals coupled to the demodulation means;

local oscillating means having a frequency that varies in response to a frequency difference; and processing means for processing the I or Q signals, the processing means performing a method comprising the steps of:

filtering a first signal of the received signals to produce a first filtered signal;

buffering the first signal to produce a buffered signal;

determining if the frequency correction tone is present in the first signal by determining an energy of the first signal and an energy of the first filtered signal and a duration for which a relationship between these energies exists;

when the frequency correction tone is present, filtering the buffered signal to produce a second filtered signal; and when the frequency correction tone is present, determining from the second filtered signal the frequency difference between the carrier frequency of the first signal and a frequency of the local oscillating means.

* * * * *